United States Patent [19]

Tokieda et al.

[11] Patent Number: 5,207,847
[45] Date of Patent: May 4, 1993

[54] PNEUMATIC TIRE OF LOW PROFILE HAVING A TIE RUBBER BETWEEN THE TREAD AND SIDEWALL

[75] Inventors: Akinori Tokieda, Fujisawa; Masakazu Kojima, Mishima, both of Japan

[73] Assignee: The Yokohama Rubber Co., Ltd., Tokyo, Japan

[21] Appl. No.: 735,316

[22] Filed: Jul. 24, 1991

[30] Foreign Application Priority Data

Aug. 14, 1990 [JP] Japan .................................. 2-213715

[51] Int. Cl.$^5$ .............................................. B60C 13/00
[52] U.S. Cl. .................. 152/209 R; 152/525
[58] Field of Search ................... 152/209 R, 524, 525, 152/532

[56] References Cited

U.S. PATENT DOCUMENTS 4,006,766  2/1977  Takayanagi et al. ................ 152/525
4,152,186  5/1979  Shibata ................................. 152/525
4,255,296  3/1981  Ogawa et al. ...................... 525/86 X
4,960,834  10/1990  Wideman ......................... 525/388 X

FOREIGN PATENT DOCUMENTS 199247  8/1991  Japan .................................... 152/525

Primary Examiner—Geoffrey L. Knable
Attorney, Agent, or Firm—Finnegan, Henderson, Farabow, Garrett & Dunner

[57] ABSTRACT

A pneumatic tire of a low profile is disclosed which is constructed with a a cap tread, a sidewall and a tie rubber interposed therebetween. The cap tread is formed from a rubber composition comprised of a styrene-butadiene rubber of a high styrene content. The tie rubber comprises a specified sum of a syndiotatic-1,2-butadiene rubber and a cis-1,4-butadiene rubber. Use of the tie rubber is conductive to sufficient adhesion of the tread to the sidewall without shoulder blistering after vulcanization.

2 Claims, 1 Drawing Sheet

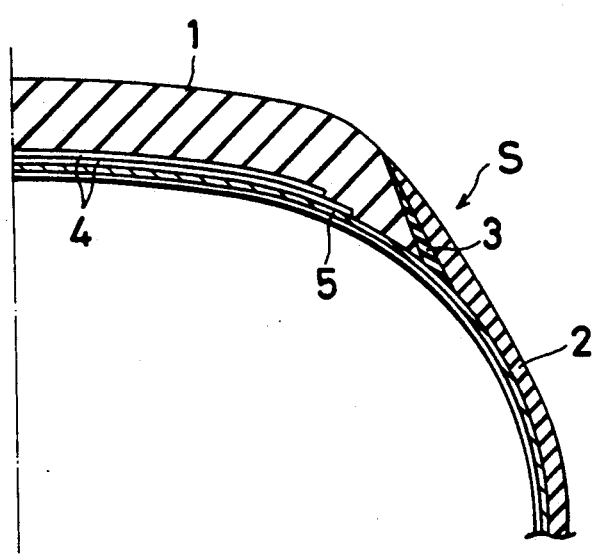

PNEUMATIC TIRE OF LOW PROFILE HAVING A TIE RUBBER BETWEEN THE TREAD AND SIDEWALL

BACKGROUND OF THE INVENTION

1. Field of the Invention

This invention relates to pneumatic tires and has particular reference to such a tire constructed with reduced profile and with improved bondability between a cap tread and a sidewall.

2. Description of the Prior Art

When pneumatic tires are produced, a cap tread is brought into integral joining with a sidewall. To this end a "Side Over Cap (SOC)" structure is commonly accepted in which the cap tread is disposed to be overlapped at its two opposite sides with two corresponding sides of the sidewall.

To attain several important qualities of a tire of the character mentioned, a certain rubber composition has been used to form a cap tread, which composition is made up of a styrene-butadiene rubber of a high styrene content blended in an amount of more than 50 parts by weight per 100 parts by weight of the total rubbery component. Such a rubber, referred to simply as HS-SBR, is configured to have a styrene content of greater than 28% by weight and reputed as exhibiting sufficient resistance to wet skidding.

The above rubber composition, however, is rather poor in tackiness and hence less adhesive to a rubber material in common use for sidewall formation. This poses vulcanization failures, namely objectionable blisters or air entrainments which may take place at a shoulder portion of the cap tread after vulcanization of the resulting green tire. For convenience such nature of failure is hereunder called "shoulder blistering".

A "Cap Over Side (COS)" structure is also known in which a cap tread is joined with a sidewall with use of a tie rubber laid at a shoulder portion of the cap tread. The tie rubber is rendered similar to a rubber material employed for the sidewall. In that instance the tie rubber is positioned over two opposite sides of the cap tread after which the whole is extruded into an integral form, followed by assembling of the extrudate with the sidewall. The tie rubber-laden sides of the cap tread are held in overlapped relation to the sidewall.

The prior tie rubber generally of natural rubber, cis-1,4-butadiene rubber or their mixture is highly shrinkable with heat and necessarily shorter at both ends than the tread rubber while in vulcanization. This needs tedious forcible pulling of the ends of the tie rubber so as to effect joining with the sidewall.

In the case where it is applied to a pneumatic tire of a cross-sectionally low profile or height, say of 60% or below in aspect ratio, the COS structure tends to cause released or peeled joint between the cap tread and the sidewall under flexing load during running of the tire. In the COS structure the sidewall is smaller in length than the tie rubber-laden tread and thus liable to displace out of the overlapped joint or otherwise get abutted against or matched with a marginal edge of the tie rubber-laden tread.

SUMMARY OF THE INVENTION

The present invention seeks to provide a new pneumatic tire of a low section height which is of an SOC structure taking advantage of the inherent properties of an HS-SBR rubber at a cap tread and having freedom from shoulder blistering, thus contributing to safe running even under severe flexural fatigue conditions.

Many other objects and advantages of the invention will be better understood from the following description taken in conjunction with the accompanying drawing.

More specifically, the invention provides a pneumatic tire of a low profile having an aspect ratio of smaller than 60% which comprises: a cap tread formed from a rubber composition comprising a styrene-butadiene rubber having a styrene content of greater than 28% by weight in an amount of more than 50 parts by weight per 100 parts by weight of the total rubber component; a sidewall; and a tie rubber interposed between the cap tread and the sidewall, the tie rubber comprising a syndiotactic-1,2-butadiene rubber and a cis-1,4-butadiene rubber totalling at or above 50 parts by weight per 100 parts by weight of the total rubber material, the syndiotactic-1,2-butadiene rubber being contained in an amount of at least 30 parts by weight, whereby the cap tread is disposed to be overlapped at its two opposite sides with two corresponding sides of the sidewall.

BRIEF DESCRIPTION OF THE DRAWINGS

The accompanying drawing represents, cross-sectionally and segmentally, of the pneumatic tire of a low profile and of an SOC structure embodying the present invention.

DETAILED DESCRIPTION OF THE INVENTION

According to the present invention, there is provided a low-profile, SOC-structure tire of a pneumatic type as illustrated in the drawing.

The tire of the invention is comprised essentially of a cap tread 1, a sidewall 2, a shoulder S located at one side of the tread 1 and doped toward the sidewall 2, and a tie rubber 3 interposed at the shoulder S between the tread 1 and the sidewall 2. Belts 4 are positioned underneath the tread 1, and a carcass 5 is disposed to extend along the belts 4 and the sidewall 2.

The cap tread 1 may be formed from one of rubber mixes specified to contain an HS-SBR rubber of more than 28% by weight in styrene content. Although sufficiently skidless on wet roads, the HS-SBR rubber is less thermally shrinkable in nature and less bondable to other different rubbers. This rubber should be blended in an amount of not less than 50 parts by weight based on 100 parts by weight of the total rubbery material.

Rubber mixes eligible for use in the sidewall 2 are preferably those predominantly of natural rubber (NR) and cis-1,4-butadiene rubber (Cis-BR) which are highly resistant to flex fatigue and to weathering. These mixes are not specifically restrictive but possibly feasible as in conventional manner.

The tie rubber 3 should importantly comprise a syndiotactic-1,2-butadiene rubber (VCR) and a Cis-BR rubber. The VCR and Cis-BR rubbers may be added in a sum of at least 50 parts by weight, preferably 55 to 70 parts by weight, based on 100 parts by weight of the total rubbery material. Rubbery materials other than VCR and Cis-BR may by suitable choice be from NR, SBR and other diene rubbers either alone or in combination. Also importantly, the amount of VCR should be larger than 30 parts by weight per 100 parts by weight of the total rubber.

Smaller sums of VCR and Cis-BR than 50 parts by weight should be avoided to preclude adverse cracking. Lower VCR contents than 30 parts by weight would be ineffective to reduce thermal shrinkage and responsible for shoulder blistering.

Specific amounts of VCR according to the invention render the resulting tie rubber less susceptible to thermal shrinkage and minimize the difference in thermal shrinkage between the tie rubber and the cap tread, leading to good dimensional stability and processing convenience and hence adequate adhesion to the cap tread. A combination of VCR and Cis-BR further compensates for improved resistance to flexing fatigue which in turn gives enhanced bondability between the tread and the sidewall.

The foregoing rubber compositions for use in the cap tread, sidewall portion and tie rubber, respectively, may be blended with various other additives such as carbon blacks, sulfurs, vulcanization accelerators, zinc oxides, antioxidants, stearic acids, softeners and the like.

The tie rubber according to the invention may be incorporated with a sulfenamide type accelerator in an amount of greater than 50% by weight, preferably above 60% by weight, of the total accelerator component. This accelerator acts to inhibit sulfur from blooming, making the tie rubber sufficiently tacky to the sidewall portion. Suitable accelerators include N-cyclohexyl-2-benzothiazole sulfenamide (CBS), N-oxydiethylene-2-benzothiazole sulfenamide (OBS), N-t-butyl-2-benzothiazole sulfenamide (BBS) and the like.

To implement the invention, the tie rubber after being placed at both sides of the cap tread is extruded into a composite sheet. Owing to its thermal shrinkage mediate between the tread rubber and the sidewall rubber, the extrudate makes the resultant tie rubber dimensionally stable and sufficiently tacky and thus fully immune from shoulder blistering.

The invention will now be described by way of the following examples which should not be regarded as limitive but as illustrative. In these examples all the formulations are parts by weight.

Four different tires, Tires A through D, were produced which were of an SOC structure seen in the drawing, profiled to an aspect ratio of 50% and set to a size of 225/50ZR16. Rubber mixes of Table 1 were used to form a cap tread and a sidewall portion in each of the test tires with use of a tie rubber shown in Table 2 and varied in composition.

Tire A was inventive and Tires B to D comparative. Tire E was tested as a control in which a cap tread and a sidewall portion were conventionally allowed to join with each other, i.e. with a tie rubber omitted.

All the tires were checked for shoulder blistering after vulcanization with the results listed in Table 2. This failure was determined from the following equation.

$$SB (\%) = X/Y$$

SB : shoulder blistering
X : total number of vulcanized tires
Y : number of vulcanized tires showing shoulder blistering corresponding in shape and magnitude to inventive tire As appears clear from the test results, Tire A representing the invention has proved to reveal a sharp decline in shoulder blistering. This results from the use of a tie rubber containing more than 50% of a sulfenamide type accelerator, leading to full freedom from sulfur blooming and hence acceptable tackiness and adhesiveness between the tread and the sidewall. Blending of VCR in an amount exceeding 30 parts by weight in the tie rubber reduces the difference in thermal shrinkage between the cap tread and the tie rubber, meaning improved processability and reduced blistering.

A small amount of VCR outside the scope of the invention is not effective to prevent shoulder blistering as is evident from Tire B. Tire C having omitted a sulfenamide accelerator caused shoulder blistering to a great extent.

TABLE 1

| rubber mix | cap tread | sidewall |
|---|---|---|
| HS-SBR[1] | 82.50 | — |
| SBR[2] | 55.00 | — |
| NR (RSS No. 3) | — | 40.00 |
| Cis-BR[3] | — | 60.00 |
| zinc oxide | 3.00 | 3.00 |
| stearic acid | 2.00 | 1.00 |
| antioxidant 6C | 2.00 | 3.00 |
| wax | 2.00 | 2.00 |
| carbon black N234 | 90.00 | — |
| carbon black N550 | — | 50.00 |
| aromatic oil | 12.50 | 5.00 |
| accelerator OBS | 1.50 | — |
| accelerator MBTS | — | 1.40 |
| sulfur | 2.10 | 1.75 |

[1] NIPOL 4520, 35%-styrene content, emulsion-polymerized, oil-extended, Nippon Zeon Co.
[2] NIPOL 1712, 23%-cis content, oil-extended, Nippon Zeon Co.
[3] NIPOL 1220, Nippon Zeon Co.

TABLE 2

| tie rubber | Tire A | Tire B | Tire C | Tire D | Tire E |
|---|---|---|---|---|---|
| NR (RSS No. 3) | 40 | 40 | 40 | 40 | 40 |
| Cis-BR (NIPOL 1220) | 20 | 40 | 20 | 60 | 60 |
| VCR | 40 | 20 | 40 | — | — |
| zinc oxide | 3 | 3 | 3 | 3 | 3 |
| stearic acid | 1 | 1 | 1 | 1 | 1 |
| antioxidant 6C | 3 | 3 | 3 | 3 | 3 |
| wax | 0.5 | 0.5 | 0.5 | 2.0 | 2.0 |
| carbon black N550 | 50.00 | 50.00 | 50.00 | 50.00 | 50.00 |
| aromatic oil | 10.00 | 8.00 | 5.00 | 5.00 | 5.00 |
| accelerator OBS | 0.80 | 0.80 | — | — | — |
| accelerator MBTS | 0.50 | 0.50 | 1.40 | 1.40 | 1.40 |
| sulfur | 1.75 | 1.75 | 1.75 | 1.75 | 1.75 |
| shoulder blistering (%) | 0.2 | 1.0 | 2.0 | 3.5 | 3.5 |

What is claimed is:

1. A pneumatic tire of a low profile having an aspect ratio of smaller than 60% which comprises:
   (a) a cap tread formed from a rubber composition comprising a styrene-butadiene rubber having a styrene content of greater than 28% by weight in an amount of more than 50 parts by weight per 100 parts by weight of the total rubber component;
   (b) a sidewall; and
   (c) a tie rubber interposed between said cap thread and said sidewall, said tie rubber comprising a syndiotactic-1,2-butadiene rubber and a cis-1,4-butadiene rubber totalling at or above 50 parts by weight per 100 parts by weight of the total rubber material, said syndiotactic-1,2-butadiene rubber being contained in an amount of at least 30 parts by weight, and a vulcanization accelerator comprising at least 50% by weight, based on the total weight of the accelerator, of a sulfenamide type vulcanization accelerator, whereby said cap tread is disposed to be overlapped at its two opposite sides with two corresponding sides of said sidewall.

2. A pneumatic tire according to claim 1 wherein said sulfenamide type vulcanization accelerator is N-cyclohexyl-2-benzothiazole sulfenamide, N-oxydiethylene-2-benzothiazole sulfenamide or N-t-butyl-2-benzothiazole sulfenamide.

* * * * *